United States Patent [19]

Nakata et al.

[11] Patent Number: 4,990,811
[45] Date of Patent: Feb. 5, 1991

[54] BRUSH HOLDING STRUCTURE FOR MOTOR

[75] Inventors: Masashi Nakata, Kosai; Tetsuro Shimmura, Toyohashi, both of Japan

[73] Assignees: Asmo Co., Ltd., Shizuoka; Nippondenso Co., Ltd., Aichi, both of Japan

[21] Appl. No.: 491,106

[22] Filed: Mar. 9, 1990

[30] Foreign Application Priority Data

May 16, 1989 [JP] Japan .................................. 1-122398

[51] Int. Cl.$^5$ ...................... H02K 5/14; H02K 13/10; H01R 39/39
[52] U.S. Cl. ..................................... 310/239; 310/242
[58] Field of Search ................ 310/239, 241, 242, 244

[56] References Cited

U.S. PATENT DOCUMENTS

| 847,413 | 7/1981 | Levashou | 310/239 |
|---|---|---|---|
| 2,842,692 | 7/1958 | Johnson et al. | |
| 2,991,379 | 7/1961 | Van Dam | 310/239 |
| 3,010,042 | 11/1966 | Moore et al. | |
| 3,022,434 | 2/1962 | Kester | |
| 3,025,421 | 3/1962 | Sievert | |
| 3,271,605 | 9/1966 | Drabik | |
| 3,430,084 | 2/1969 | Hall et al. | |
| 4,389,588 | 6/1983 | Rankin | |
| 4,800,313 | 1/1989 | Warner et al. | 310/242 |

FOREIGN PATENT DOCUMENTS

| 658776 | 3/1938 | Fed. Rep. of Germany. | |
|---|---|---|---|
| 3010036 | 10/1981 | Fed. Rep. of Germany. | |
| 3022434 | 12/1981 | Fed. Rep. of Germany. | |
| 58-112075 | 7/1983 | Japan | 310/239 |
| 60-82966 | 6/1985 | Japan. | |
| 61-62547 | 4/1986 | Japan. | |

Primary Examiner—Steven L. Stephan
Assistant Examiner—D. L. Rebsch
Attorney, Agent, or Firm—Venable, Baetjer, Howard & Civiletti

[57] ABSTRACT

A brush holding structure for guiding a brush to a commutator is supported in a motor case. The structure includes an insulator plate attached to the motor case. The insulator plate is provided with guide means for guiding the brush in a direction which is inclined to a radial direction of the commutator within a plane including the axis of the commutator. The structure further includes a plate-like spring which has, at both ends, coil portions for winding up. An intermediate part of the plate-like spring presses the brush against the commutator to hold the brush in contact with the commutator without any play.

19 Claims, 6 Drawing Sheets

BRUSH HOLDING STRUCTURE FOR MOTOR

BACKGROUND OF THE INVENTION

1. Field of the Invention

The present invention relates to a structure for holding a brush of a motor, which brush is radially pressed against a commutator.

2. Background Information

Generally, respective brushes of a direct current motor are so arrnaged as to be pressed against a commutator in radial directions thereof, or directions perpendicular to the axis of the commutator.

In this case, each brush there is play or fine movements due to a clearance between a brush holder and the brush to cause the occurrence of noise at the time when the motor rotates. Therefore, a structure for biasing each brush in a tangential direction of a commutator by means of a resilient body to press the brush against the interior of a holder has been proposed in Japanese Utility Model Application Laid Open No. SHO 61-62547. Also, having been proposed in Japanese Utility Model Application Laid Open No. SHO 60-82966 is a structure in which each brush holder is disposed close to the outer periphery of a commutator as much as possible to stabilize a holding force for a brush.

In these motors, however, because pressing forces for the respective brushes vary as the brushes wear, it is impossible to always give the respective brushes uniform pressing forces.

Moreover, in these motors, consideration is given to only the play of the respective brushes occurring in the radial directions of the commutators, and the play of the respective brushes occurring in the axial directions of the commutators has not been considered. Hitherto, therefore, in order to eliminate the play of each brush which occurs in the axial directions of a commutator, a structure for inclining the brush within a plane along the axial direction of the commutator has been proposed in Japanese Utility Model Application Laid Open No. SHO 58-112075. However, even with this motor, a biasing force for pressing the brush varies as the brush wears, and it is therefore impossible to ensure elimination of the play of the brush.

SUMMARY OF THE INVENTION

An object of the present invention is to provide, in view of the above facts, a structure for holding a brush, which is capable of eliminating the play of a brush in the plane including the rotary shaft of a commutator while being capable of always obtaining a uniform pressing force for the brush even when the brush wears.

The present invention is characterized by a brush holding structure for a motor, which holds a brush to be pressed by a biasing force against a commutator rotating about its axis, wherein the structure comprises guide means for guiding the brush to the commutator in a direction which is inclined with respect to a radial direction of the commutator, a leaf spring having winding coil portions formed at both ends thereof, a commutator pressing portion formed in an intermediate part of the leaf spring to come into contact with a rear of the brush, and a holding portion formed in the leaf spring on both sides of the pressing portion thereof for coming into contact with sides of the brush to restrain the brush from moving in tangential directions of the commutator.

In the present invention, with the above structure, the brush is inclined by the guide means within the plane which includes the rotary shaft of the commutator, and receives a pressing force due to the bias by the leaf spring. Accordingly, the brush is always pressed in one of the axial directions of the commutator at the time when the commutator rotates, and the play of the brush in the axial directions of the commutator can be prevented. Further, because the brush is pressed against the commutator by the intermediate part of the leaf spring which has both ends formed into coil portions, the coil portions enable the leaf spring to give the brush a substantially uniform pressing force even when the brush has worn. In addition, as the holding portions formed on the both sides of the brush pressing portion hold the brush in the tangential direction of the commutator, the play of the brush within the plane which is perpendicular to the axis of the commutator can also be prevented.

Incidentally, as a part of the guide means, an inclined surface may be formed on an insulator plate, which is attached to a motor case, to serve for a guide of the brush. This formation enables the brush to face the commutator with good accuracy.

Further, receiving portions which receives the respective coil portions of the leaf spring may be so formed that they do not support the winding coil portions at axes thereof by means of support shafts but support the same correspondingly with the circumferences of the winding coil portions. With these receiving portions, any unnecessary external force is not caused, even when the leaf spring is drawn out from or wound up into winding coil portions, so that a uniform biasing force can be provided to the commutator pressing portion.

DESCRIPTION OF THE PREFERRED EMBODIMENT

Figure 2:
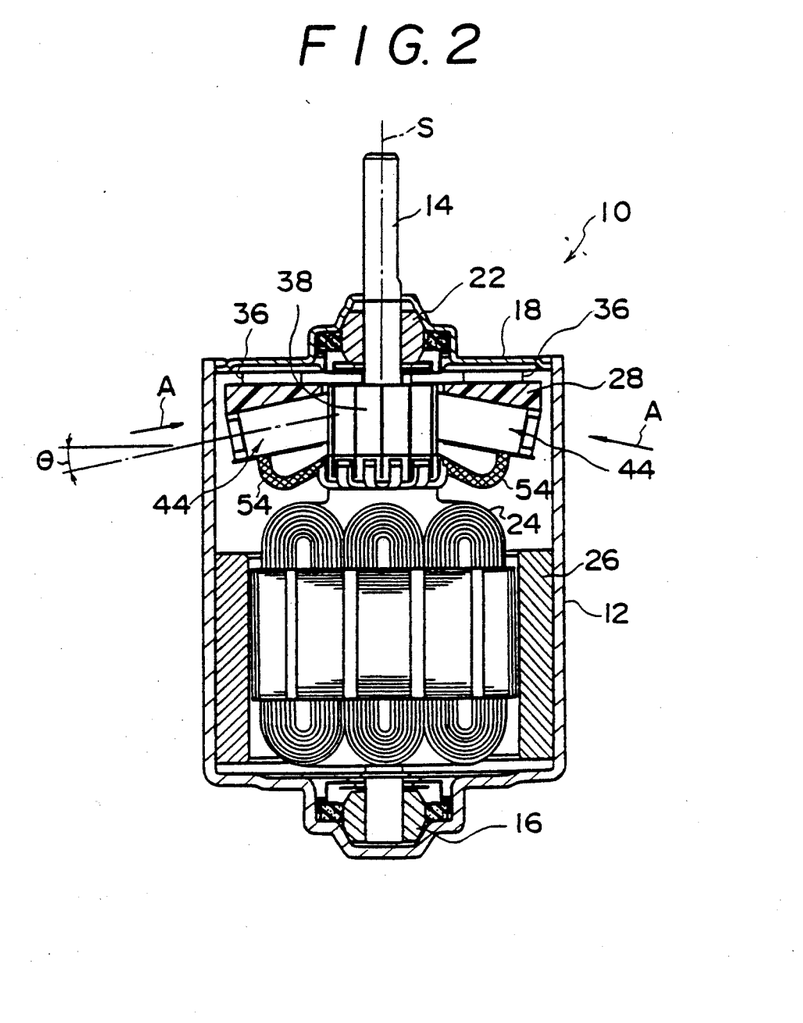
FIG. 2 is a sectional view taken along the axis of the motor showing a motor in which the invention is applied.
Figure 3:
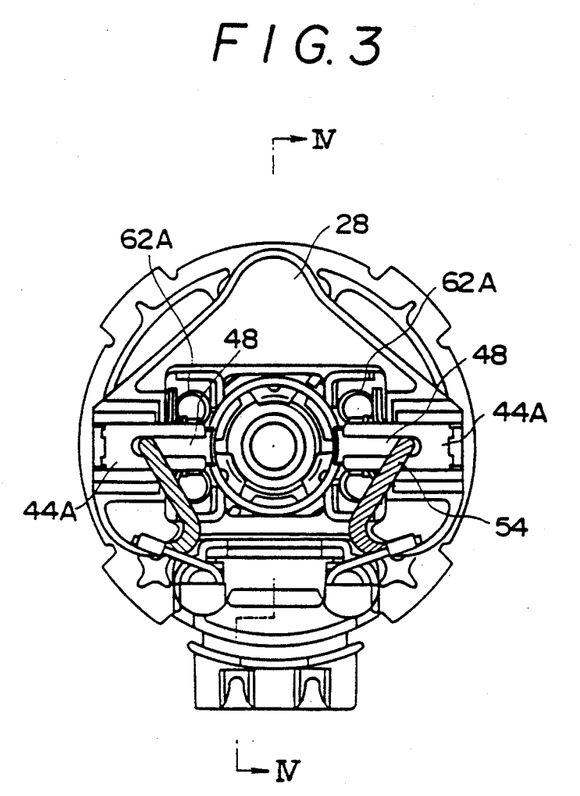
FIG. 3 is a front view showing the state in which brushes are installed on an insulator plate. The view is equivalent to a plan view of the motor shown in FIG. 2.

Referring to FIG. 2, a motor 10 to which the present invention is applied is shown. This motor 10 has a rotary shaft 14 which is coaxially inserted into a cylindrical shaped motor case 12 and supported by bearings 16 and 22. The bearing 16 is provided in a bottom portion of the motor case 12, while the bearing 22 is secured to a bracket 18 which is fitted into an inlet opening of the motor case 12. The rotary shaft 14 is provided with a coil 24 which is wound around a core and which corresponds to magnets 26 fixed on the inner periphery of the motor case 12.

Figure 4:
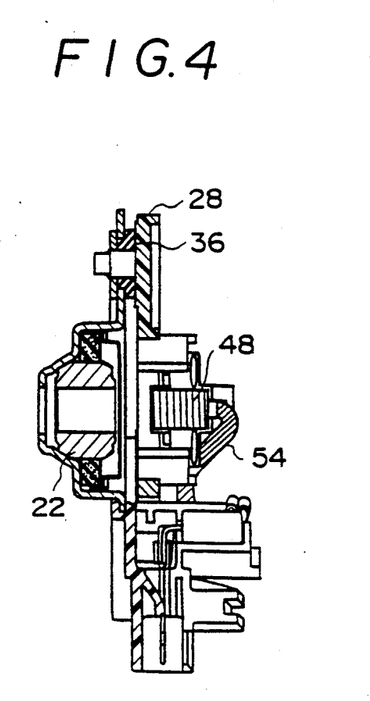
FIG. 4 is a sectional view taken along line IV—IV in FIG. 3.
Figure 8:
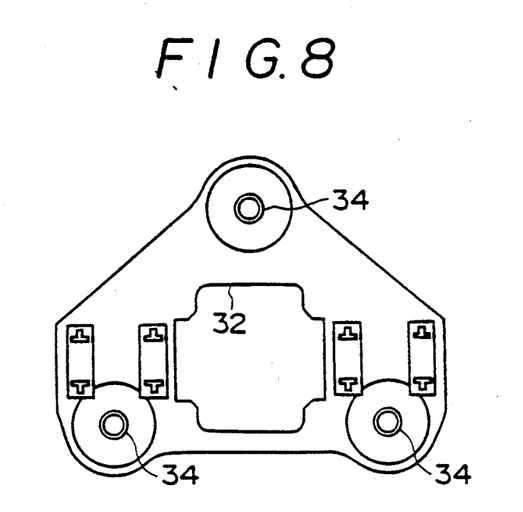
FIG. 8 is a rear view of the plate shown in FIG. 7.

An insulator plate 28 is fixedly installed to the bracket 18 in the inlet opening of the motor case 12. This insulator plate 28 is formed of a thin synthetic resin as shown in FIGS. 1 and 5 through 8, and has a through hole 32 perforated in a central portion thereof. As shown in FIG. 8, on the rear of the insulator plate, three fixing legs 34 are formed to protrude so that they surround the through hole 32. The insulator plate 28 is secured to the bracket 18 via these fixing legs 34 and spacers 36 as shown in FIG. 4. A commutator 38 is fixedly installed on the rotary shaft 14 to rotate under the condition that it is inserted into the through hole 32.

Figure 5:
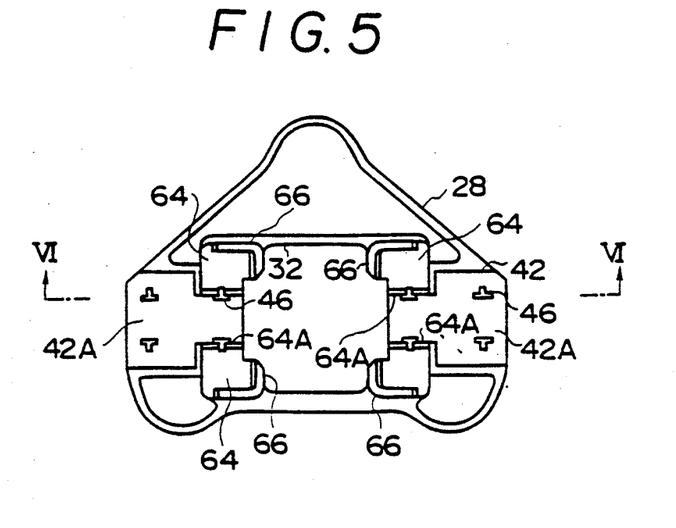
FIG. 5 is a front view of the insulator plate.
Figure 6:
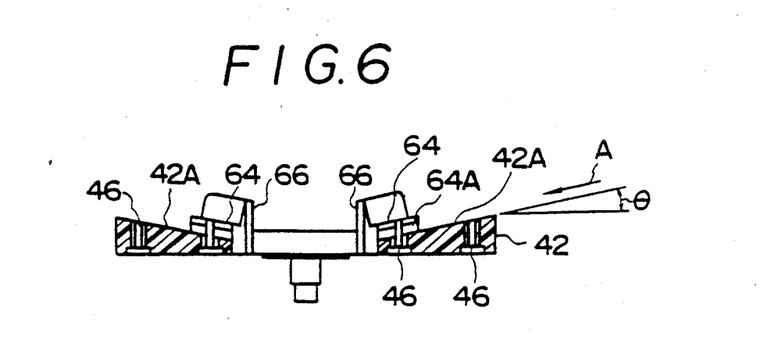
FIG. 6 is a sectional view taken along line VI—VI in FIG. 5.
Figure 7:
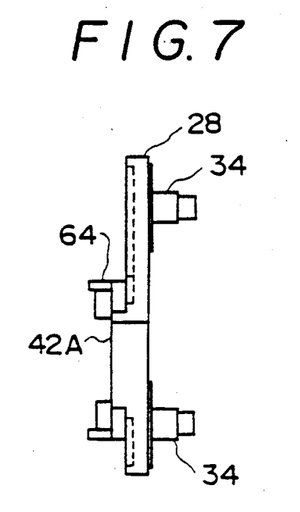
FIG. 7 is a side view of the plate shown in FIG. 5.

On the insulator plate 28, raised portions 42 are formed integrally therewith at opposite positons, with the through hole 32 lying therebetween. The top face of each of these raised portions 42 is heightened at its remoter end from the through hole 32 in such a manner that it is inclined within the plane including an axis S of the rotary shaft 14, which serves as a rotary shaft of the commutator 38, at an angle $\theta$ with respect to a radial direction of the rotary shaft 14 so as to form an inclined surface 42A.

Figure 1:
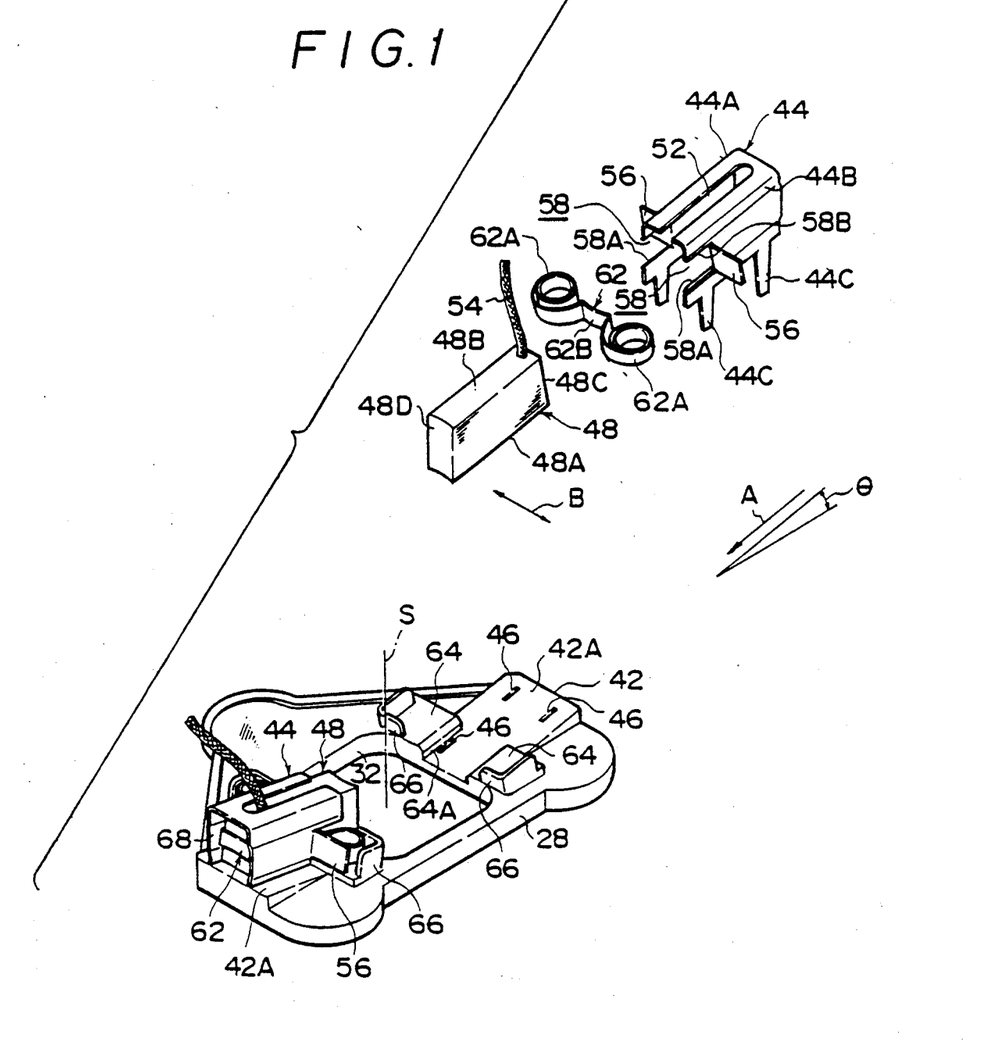
FIG. 1 is an exploded perspective view showing an essential part of the structure according to an embodiment of the present invention.

Brush holders 44 are securely installed on these inclined surfaces 42A, respectively. Each holder 44 is made of a thin plate material by bending the same as shown in FIGS. 1 and 10, and is in the shape of an inverted letter U in cross section, in which a pair of leg portions 44B are respectively bent at right angles to a top portion 44A of the brush holder on both sides thereof. Each leg portion 44B has a fixing piece 44c which projects therefrom to be inserted into a fixing hole 46 formed in the corresponding raised portion 42. The bush holders 44 are fixedly attached onto the respective inclined surfaces 42A by bending the ends of the fixing pieces at the rear of the insulator plate 28. In this state, each brush holder 44 holds a brush 48 between the holder and the corresponding inclined surface 42A to guide the same along the inclined surface 42A of the raised portion in a direction, as indicated by an arrow A, for contact of the brush with the commutator 38 in the through hole 32. This direction is inclined within the plane including the axis S of the rotary shaft 14 at the angle $\theta$ with respect to the radial direction of the rotary shaft 14.

Each brush 48 is in the shape of a substantially rectangular block, and its bottom face 48A serves as a sliding face on the inclined surface 42A. A top face 48B of the brush is parallel to a bottom face 48A thereof, and a rear face 48C of the brush is perpendicular to the bottom face 48A. However, a face 48D of the brush for contact with the commutator 38 is inclined at angle $\theta$ to the rear face 48C so as to come into contact with an outer periphery of the commutator 38 over a wide area. The commutator is formed in a cylindrical shape around the axis of the rotary shaft 14.

The leg portions 44B of each brush holder 44 are made identical in their heights from the inclined surface 42A of the raised portion, and the top portion 44A of the holder is parallel to the top face 48B of the brush 48.

Further, an elongated hole 52 is formed in the top portion 44A of the brush holder 44 to longitudinally extend from a front end thereof (the end closer to the commutator 38) and serves as a hole for allowing the passage of a connection pig tail 54 which leads to the bottom face 48A of the brush 48.

Moreover, in each of the front ends of the leg portions 44B of the brush holder 44, a piece 56 cut and bent outwardly, is formed at its front end to thereby form a substantially U shaped rectangular cut-out portion 58.

Opposite edges 58A and 58B of the cut-out portion 58 are parallel to the inclined surface 42A to serve as guide faces for a leaf spring 62. More particularly, the leaf spring 62 has coil portions 62A formed at both ends thereof, and an intermediate part of the leaf spring constitutes a pressing portion 62B which is to come into abutment with the rear face 48C of the brush 48 so as to press the brush 48 against the commutator 38 by a biasing force of the coil portions 62A. The width of this leaf spring 62 is so sized as to be slightly smaller than the distance between the opposite edges 58A and 58B, so that the leaf spring 62 is positioned widthwise by the cut-out portions 58 when being drawn out or wound up.

Further, the leaf spring 62 is so arranged as to rest at one of its widthwise edges on spring receiving portions 64 which are formed on the respective raised portions 42 at opposite positions thereof to further protrude above the raised portions 42. By virtue of this arrangement, even when the leaf spring 62 receives an external force in the direction in which it passes the brush 48, (in the direction of the arrow A) the coil portions 62A are prevented from unraveling into a so-called bamboo shoot or telescope phenomenon in which their inner winding layers coaxially slip out from their outer winding layers in the axial direction thereof. Incidentally, these spring receiving portions 64 are formed at the same angle $\theta$ of inclination as the inclined surface 42A.

Spring receiving walls 66 respectively protrude from end faces on through hole 32 sides of the spring receiving portions 64 to confront the cut pieces 56. Each spring receiving wall 66 has, on the opposite side thereof to the brush holder 44, an end portion which is bent at a substantially right angle with respect to the remaining portion of the wall, and is formed into the shape of a letter L, so that the spring receiving wall 66 encloses, in cooperation with the corresponding cut piece 56, the coil portion 62A to hold the same. Thus, the cut piece 56 and the spring receiving wall 66 do not restrain the coil portion 62A at the axis thereof, but constitute a receiving portion which holds the coil portion 62A correspondingly with its circumference. These receiving portions support the circumferences of the respective coil portions 62 to prevent an unnecessary external force from acting on the coil portions 62 when the leaf spring is drawn out or wound up, and further serve to support the leaf spring 62 when the brush 48 is assembled.

Incidentally, opposite side faces 64A of the spring receiving portions 64, which portions are respectively raised at opposite positions on each raised portion 42, are arranged to abut against the outer sides of the respective leg portions 44B at positions close to the inclined surface 42A and the through hole 32. This prevents the leg portions 44B of each brush holder 44 from spreading outwardly.

Figure 9:
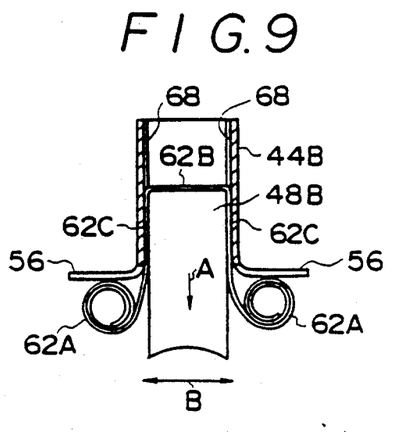
FIG. 9 is a sectional view showing the relationship between the brush and a coil spring. The view corresponds to a section taken along line IX—IX in FIG. 10A.
Figure 10A:
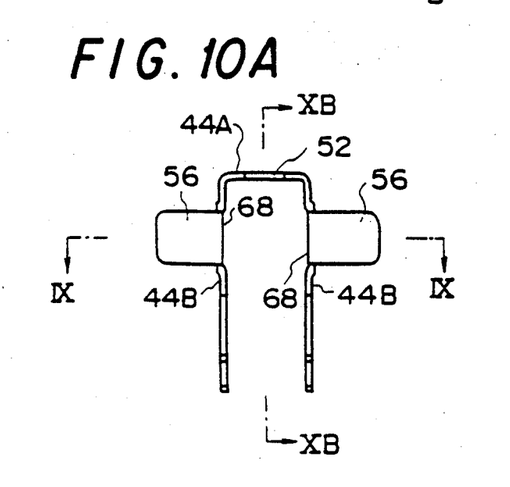
FIG. 10A is a front view of a brush holder.
Figure 10B:
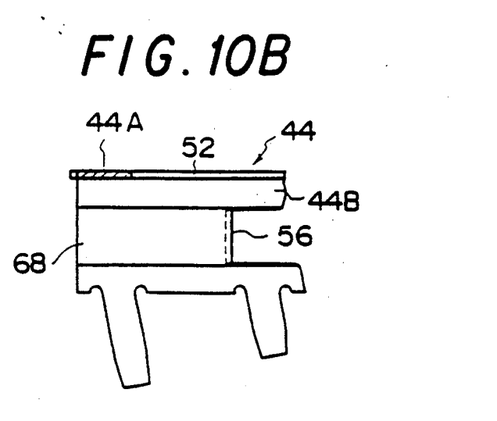
FIG. 10B is a sectional view taken along line XB—XB in FIG. 10A.
Figure 10C:
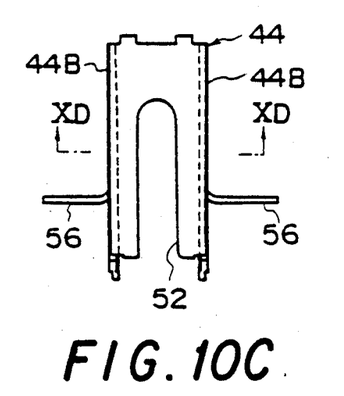
FIG. 10C is a plane view of the brush.
Figure 10D:
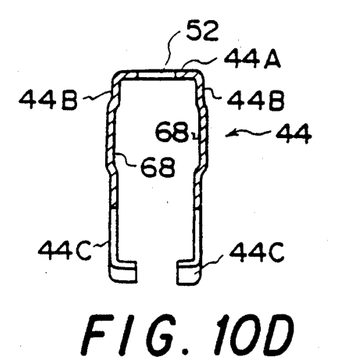
FIG. 10D is a sectional view of leg portions in their caulked state. The view corresponds to a section taken along line XD—XD in FIG. 10C.

As shown in FIG. 10, in heightwise intermediate parts of each brush holder 44, enlarged width portions 68 are formed to widen the widthwise size for receiving the brush 48. These enlarged width portions 68 are provided for receiving holding portions 62C of the leaf spring 62. The holding portions are positioned on opposite sides of the brush 48 when the same is held in the brush holder 44. The holding portions 62C are continuously formed on both sides of the pressing portion 62B so that the pressing portion 62B and the holding portions 62c present substantially the shape of an inverted letter U as shown in FIG. 9. Accordingly, the enlarged width portions 68 stretch to the respective rectangular cut-out portions 58, and the leaf spring 62 has the holding portions 62C which are received in the enlarged width portions 68 and respectively stretch through the corresponding rectangular cut-out portions 58 to the coil portions 62A.

Consequently, the holding portions 62C hold the leaf spring 62 in a direction of rotation of the commutator 38, or tangential directions thereof as indicated by arrows B, to eliminate the play of the brush 48 in this direction. In addition, as the pressing portion 62B presses, within the brush holder 44, the brush 48 in the arrow A direction against the commutator 38, the brush 48 is supported at its interconnecting part of the bottom face 48A and the abutment face 48D by an end face of the inclined surface 42A which is close to the through hole 32. This produces the moment in which an interconnecting part of the top face 48B is pressed against an inside of the top portion 44A of the brush holder, so that the brush is securely received in the brush holder 44 without any play so as to eliminate the play in the plane which includes the axis of rotation of the commutator.

Incidentally, in the leaf spring 62, the coil portions 62A which respectively serve as hair springs always exert spring forces in directions in which the respective holding portions 62C are wound up. These spring forces are constant in magnitude, owing to the characteristics of hair springs, irrespective of amounts of the respective holding portions 62C being wound up into or drawn out from the coil portions 62A, and therefore, a substantially uniform biasing force can be exerted in the direction of the arrow A on the brush 48 irrespective of its size.

The operation of the present embodiment will now be described.

When each brush holder 44 has been fixed onto the insulator plate 28 by means of the fixing pieces 44C of the holder 44, the leaf spring 62 is brought into a state in which the coil portions 62A are mounted on the respective spring receiving portions 64. In this state, the pressing portion 62B of the leaf spring lies at the front end of the brush holder 44. Upon inserting the brush 48 into the brush holder 44 from the through hole 32 side thereof in the opposite direction to the arrow A direction, the pressing portion 62B is pressed by the rear face 48C of the brush 48 to move in the direction away from the through hole 32 while drawing out parts of the coil portions 62A.

By the above insertion, the pig tail 54 of the brush 48 is received in the elongated hole 52. Then, the connection of this pig tail 54 is completed, and the insulator plate 28 is fixed to the bracket 18 as shown in FIG. 2 to be attached to the motor case 12 via the bracket 18. In this installation, the rotary shaft 14 is inserted through the bearing 22 in the bracket 18, and the commutator is disposed in the through hole 32. As a result, the respective brushes 48 are pressed against the outer periphery of the commutator 38 by the biasing forces of the leaf springs 62.

During the rotation of the rotary shaft 14, as each brush 48 is inclined at the angle θ, within the plane including the axis S of the rotary shaft 14, with respect to the direction which intersects the axis at right angle, the brush 48 abuts at its front end and rear end against the inclined surface 42A of the corresponding raised portion and the top portion 44A of the brush holder, respectively and play thereof is prevented. Further, in the direction of rotation of the commutator 38, the holding portions 62C hold the brush to eliminate play thereof in this direction. When the brush 48 become worn due to the rubbing against the commutator 38, the coil portions 62A of the leaf spring gradually wind up the respective holding portions 62C, while continuing to always press the brush 48 against the commutator 38 with a uniform force by the biasing of their coil springs. Additionally, as the leaf spring is supported at its widthwise opposite edges by the rectangular cut-out portions 58 of the holder, it does not come off the brush holder 44 inadvertently.

Incidentally, although in the above embodiment, the direction of pressing of each brush (the arrow A direction) is inclined with respect to the radial direction of the axis S of rotation in such a manner as to get near the coil 24 as shown in FIG. 2, it may be inclined with respect to the radial direction of axis S of rotation in the opposite direction to that in the embodiment.

What is claimed is:

1. A brush holding structure for a motor, in which a brush is guided into contact with a commutator supported in a motor case, the structure comprising:
   (a) an insulator plate secured to the motor case and having a hole formed in a central part thereof for passage of the commutator;
   (b) a guide surface formed on said insulator plate to incline in a radial direction of the commutator within a plane including an axis of rotation thereof for allowing a bottom face of the brush to slide on said surface;
   (c) a plate-like spring provided at both ends thereof with coil portions for winding up and at an intermediate part thereof with a pressing portion for pressing a rear face of the brush to bias the brush to the commutator;
   (d) spring receiving portions raised on said insulator plate for mounting of said respective spring coil portions thereon; and
   (e) a holder fixedly attached to said insulator plate for receiving the brush, said holder being in a plate-like shape which has a top portion corresponding to a top face of the brush and a pair of leg portions respectively corresponding to both side faces of the brush, and with intermediate portions interconnecting said pressing portion and coil portions of said plate-like spring being disposed between said leg portions of the holder and the sides of the brush, said leg portions being inserted between spring seat portions of said insulator plate for prevention of spreading of said leg portions.

2. A brush holding structure for a motor, in which a brush to be pressed against a commutator rotating about an axis thereof is held, the structure comprising:
   (a) a plate-like spring for pressing the brush against the commutator;
   (b) a pressing portion provided in a longitudinally intermediate part of said plate-like spring for pressing a rear part of the brush toward the commutator;

(c) a pair of holding portions respectively bent from said pressing portion on both sides thereof to be disposed on opposite sides of the brush for holding the brush therebetween;

(d) coil portions provided at longitudinally opposite ends of said plate-like spring for biasing said respective holding portions in a direction in which said holding portions are wound up; and (e) guide means for receiving the brush together with said holding portions of said plate-like spring and holding said plate-like spring to guide the brush in a direction in which the brush comes into contact with the commutator and which is inclined to a radial direction of the commutator within a plane including the axis of rotation of the commutator, said guide means having an insulator plate which is disposed to a motor case, and has an inclined surface on which the brush is mounted to be guided in an inclined direction, whereby restraining the brush in the radial direction and an axial direction of the commutator to prevent occurrence of play of the brush.

3. A brush holding structure for a motor according to claim 2, wherein said guide means has a holder fixedly attached to said insulator plate for receiving the brush, thereby maintaining an angle of inclination of the brush with accuracy.

4. A brush holding structure for a motor according to claim 3, wherein the brush is in a rectangular shape in a cross section which is taken perpendicularly to the direction of a guide for the brush, a bottom of said rectangular cross section is guided by said inclined surface, and a top and both sides of said rectangular cross section are guided by said holder.

5. A brush holding structure for a motor according to claim 2, wherein said holder is in a plate-like shape which includes a top portion parallel to said inclined surface of said insulator plate correspondingly with a top face of the brush and a pair of leg portions bent from said top portion at substantially right angles, and said leg portions are fixedly attached to said insulator plate.

6. A brush holding structure for a motor according to claim 5, wherein said leg portions of said holder are respectively formed in inner sides thereof with enlarged width portions for respectively receiving said pair of holding portions of said plate-like spring.

7. A brush holding structure for a motor according to claim 5, wherein parts of said leg portions closer to the commutator are respectively formed, with cut-out portions for guiding interconnections of said holding portions and said coil portions of said plate-like spring, opposite edges of said cut-out portions face widthwise ends of said plate-like spring to restrain said plate-like spring from moving widthwise, and said plate-like spring is led from inside of said holder to outside thereof.

8. A brush holding structure for a motor according to claim 3, wherein said insulator plate has a pair of spring seat portions formed integrally therewith, which are parallel to said inclined surface and respectively support end faces of said spring coil portions.

9. A brush holding structure for a motor according to claim 8, wherein said spring coil portions on said respective spring seat portions are supported without being restrained at central parts of said spring coil portions, and a spring receiving wall is formed integrally with each spring seat portion to protrude therefrom to constitute a receiving portion facing an outer surface of said spring coil portion.

10. A brush holding structure for a motor according to claim 9, wherein said holder is formed with a cut-out portion formed by bending a cut section outwardly in a continuous and integral manner from one end of said cut-out portion, said cut section accommodating the coil portion of the plate-like spring between said cut section and said spring receiving wall.

11. A brush holding structure for a motor according to claim 5, wherein a space between opposite faces of said pair of spring seat portions constitutes a portion for allowing insertion of said leg portions of said holder, thereby preventing a distance between said leg portions of said holder from being widened inadvertently.

12. A brush holding structure for a motor, in which a brush is guided into contact with a commutator supported in a motor case, the structure comprising:

(a) an insulator plate secured to the motor case and having a hole formed in a central part thereof for passage of the commutator;

(b) a guide surface formed on said insulator plate to incline to a radial direction of the commutator within a plane including an axis of rotation thereof for allowing the brush to slide on said surface;

(c) a holder attached to said insulator plate for receiving the brush between said holder and said guide surface; and (d) a plate-like spring having at both ends thereof coil portions for respectively biasing said spring in directions in which said spring is wound up, a pressing portion formed at an intermediate part of said spring for coming into contact with an end of the brush to exert a pressing force thereon against the commutator, and a pair of holding portions respectively bent to said pressig portion to be disposed between said pressing portion and said coil portions, said pair of holding portions being put between the brush and said holder thereby holding the brush.

13. A brush holding structure for a motor according to claim 12, wherein a brush is in a rectangular shape in a cross section which is taken perpendicularly to the direction of a guide for the brush, a bottom of said rectangular cross section is guided by said inclined surface, and a top and both sides of said rectangular cross section are guided by said holder.

14. A brush holding structure for a motor according to claim 13, wherein said holder is in a plate-like shape which includes a top portion parallel to said inclined surface of said insulator plate correspondingly with a top face of the brush and a pair of leg portions bent from said top portion at substantially right angles, and said leg portions are fixedly attached to said insulator plate.

15. A brush holding structure for a motor according to claim 14, wherein said leg portions of said holder are respectively formed in inner sides thereof with enlarged width portions for respectively receiving said pair of holding portions of said plate-like spring.

16. A brush holding structure for a motor according to claim 13, wherein said leg portions are respectively formed, closer to the commutator, with cut-out portions for guiding interconnections of said holding portions and said coil portions of said plate-like spring, opposite edges of said cut-out portions face widthwise ends of said plate-like spring to restrain said plate-like spring from moving widthwise, and said plate-like spring is led from inside said holder to outside thereof.

17. A brush holding structure for a motor according to claim 12, wherein said insulator plate has a pair of spring seat portions formed integrally therewith, which are parallel to said inclined surface and respectively support end faces of said spring coil portions.

18. A brush holding structure for a motor according to claim 17, wherein said spring coil portions on said respective spring seat portions are supported without being restrained at central parts of said spring coil portions, and spring receiving walls are formed integrally with said respective spring seat portions to protrude therefrom to constitute receiving portions.

19. A brush holding structure for a motor according to claim 14, wherein a space between opposite faces of said pair of spring seat portions constitutes a portion for allowing insertion of said leg portions of said holder, thereby preventing a distance between said leg portions of said holder from being widened inadvertently.

* * * * *